(12) United States Patent
Haugen et al.

(10) Patent No.: US 6,461,111 B1
(45) Date of Patent: Oct. 8, 2002

(54) TAPERED POLYGON COUPLING

(75) Inventors: Ronald L. Haugen; Robert King, both of Mayfield; Jeff Schmidt, Boaz, all of KY (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/645,311

(22) Filed: Aug. 25, 2000

(51) Int. Cl.[7] .......................... F04D 29/20; F04D 29/28
(52) U.S. Cl. ................ 416/244 R; 415/216.1; 403/371; 403/374.4; 416/170 R
(58) Field of Search .................. 416/244 R, 244 A, 416/170 R, 204 R, 204 A; 415/122.1, 124.1, 216.1; 403/359.6, 371, 374.3, 374.4; 411/55, 57.1, 60.1, 60.2, 71, 73, 271

(56) References Cited

U.S. PATENT DOCUMENTS

| | | | | |
|---|---|---|---|---|
| 623,809 A | * | 4/1899 | McCreery | 411/57.1 |
| 883,215 A | * | 3/1908 | Luke | 403/371 |
| 3,055,463 A | * | 9/1962 | Lutz | 403/374.3 |
| 4,294,562 A | * | 10/1981 | Mullenberg | 403/383 |
| 4,669,911 A | * | 6/1987 | Lundgren et al. | 403/374.3 |
| 5,161,928 A | * | 11/1992 | Burdick, Jr. | 403/371 |
| 5,482,437 A | * | 1/1996 | Houston et al. | 416/244 A |
| 5,625,851 A | * | 4/1997 | Boxer | 403/371 |

FOREIGN PATENT DOCUMENTS

GB  23282 A  * 10/1911 ................. 403/371

\* cited by examiner

*Primary Examiner*—Christopher Verdier
(74) *Attorney, Agent, or Firm*—Michael Best & Friedrich LLP

(57) ABSTRACT

A tapered polygon coupling for an impeller and pinion. The pinion has a tapered bore having a polygonal cross-section. The impeller includes a corresponding tapered polygon plug configured to be placed in the bore of the pinion. A fastener is provided for securing the impeller to the pinion. The fastener passes through a passage in the plug of the impeller. The plug of the impeller is split so that when the fastener is inserted into the passage the plug expands to contact the bore and create an interference fit between the pinion and the impeller.

9 Claims, 4 Drawing Sheets

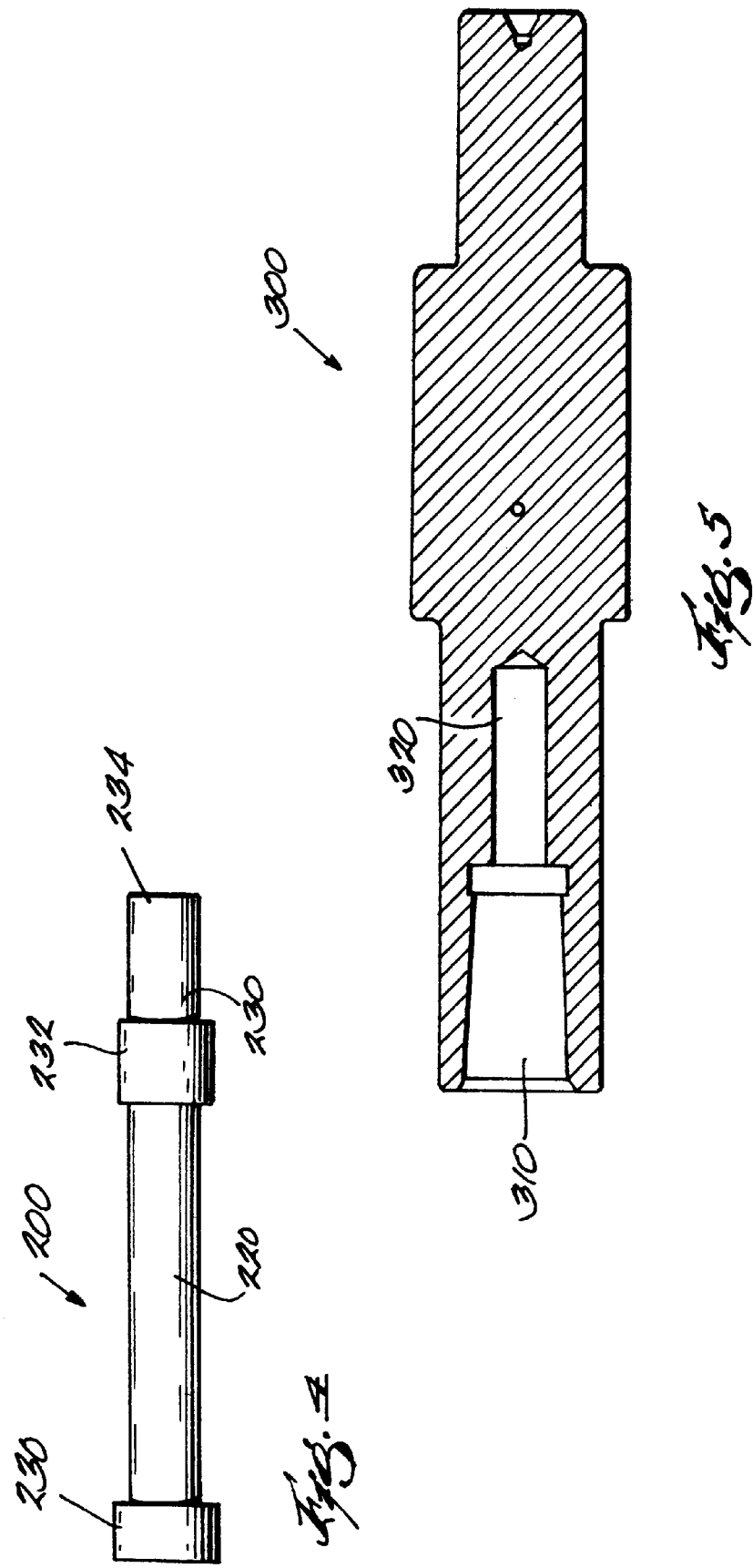

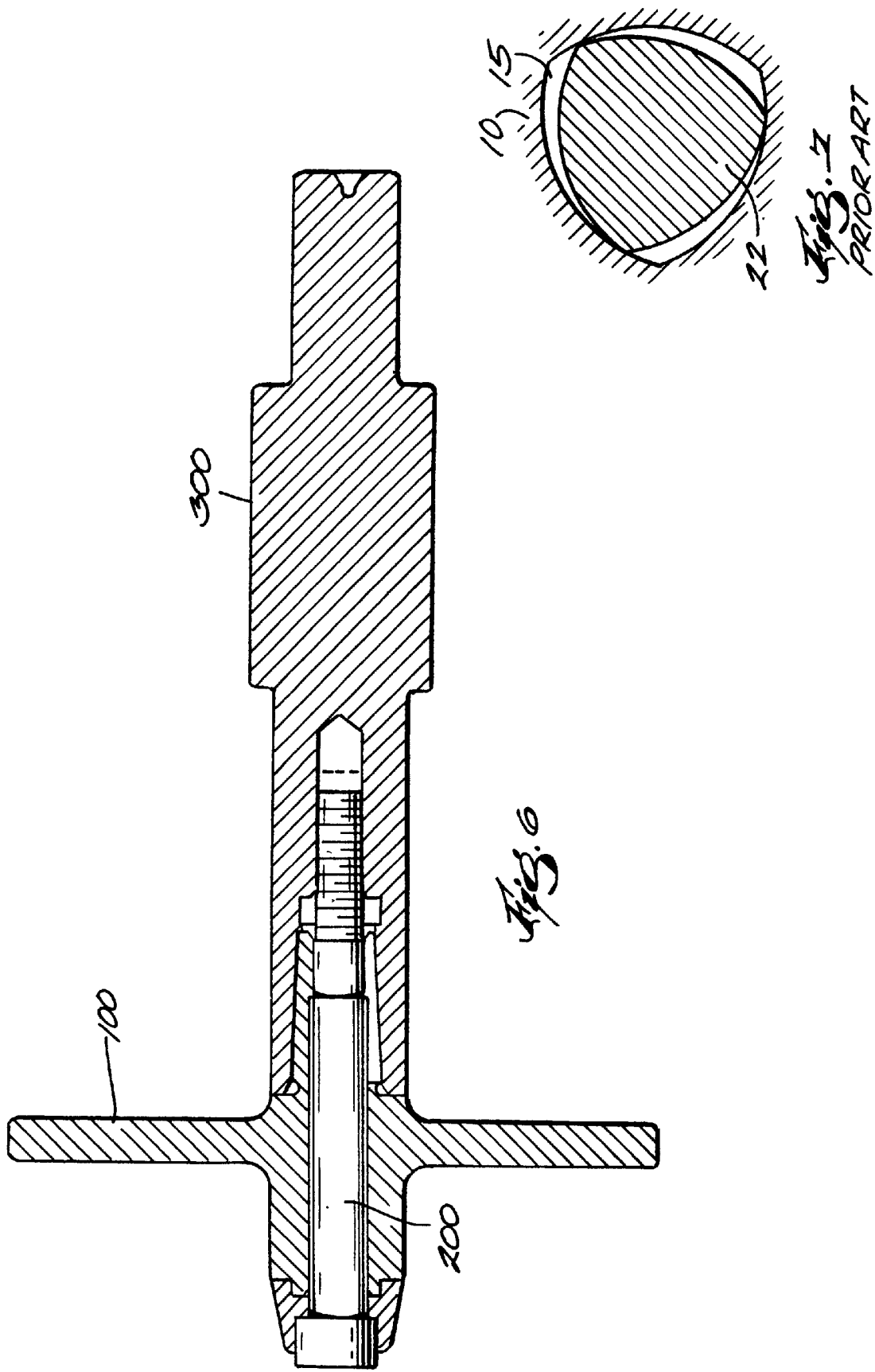

TAPERED POLYGON COUPLING

BACKGROUND

This invention generally relates to an improved polygon attachment for coupling different members. In particular, the invention relates to a coupling for connecting an impeller to a pinion or drive shaft.

Polygon shaft couplings are generally known. For example, this type of shaft coupling is described in U.S. Pat. No. 4,294,562, which is incorporated by reference herein. Typically, in such couplings, a shaft and a hub have cross sections fitting into each other, and these cross sections deviate from a circular pattern and have shapes that are convex on all sides and essentially elliptical, triangular or quadratic. The polygon coupling provides several advantages over more conventional splined connections by eliminating problems such as wear on the splines, notch effects and higher torsional stresses.

A polygon coupling may be used in a centrifugal compressor design, as shown in U.S. Pat. No. 5,482,437, which is incorporated by reference herein. For example, an impeller of a centrifugal compressor may be operatively connected to a centrifugal compressor driving shaft or pinion. In such a design, the compressor impeller includes a polygonally dimensioned male hub portion, and the compressor pinion includes a suitably dimensioned bore which receives the male hub portion of the compressor impeller. The polygon attachment must transmit torque from the pinion to the impeller, while maintaining zero relative motion between the impeller and the pinion, and permit easy assembly and disassembly that consistently returns the two parts to the original relative positions. The maintenance of position is critical to assure that the assembly retains its dynamic balance. Although this type of polygon coupling has been used with success in centrifugal compressor design, this polygon coupling is difficult to produce because of the exacting tolerances required.

As shown in FIG. 7, the polygon must consistently "lock-up" at the same position to maintain the needed level of rotor balance. Any relative movement leads to unacceptable levels of vibration during compressor operation. To assure the needed consistency, the mating parts must be machined to very exacting and expensive tolerances. Typically, the profile tolerances on are on the order of +/−0.00015 inches. Such tolerances are difficult to achieve and are difficult to validate by inspection. Therefore, it is desirable to provide an improved design which retains the advantages of the polygon attachment, but alleviates the manufacturing and inspection difficulties.

SUMMARY OF THE INVENTION

According to the present invention a coupling for attaching two members is provided. The invention includes a coupling comprising a first coupling member including a tapered bore having a polygonal shaped cross-section. The coupling further includes a second coupling member including a tapered plug having a polygonal shaped cross-section. The plug is configured to be received into the bore of the first coupling member. A fastener may be provided for securing the second coupling member to the first coupling member, the fastener being adapted to be inserted into a passage in the plug of the second coupling member. The plug of the second coupling member is split so that when the fastener is inserted into the passage the plug expands against the bore thereby creating an interference fit between the first and second coupling members.

The coupling may further include a recess positioned in a base of the bore of the first coupling member for receiving the end of the fastener. The fastener may include an end portion having a cross-sectional area greater than the cross-sectional area of the bore of the second coupling member. The bore of the second coupling member may include a region of reduced cross-sectional area adapted to surround the end portion of the fastener. The end portion of the fastener may include a threaded portion to be secured in the recess located in the base of the bore.

In an alternative embodiment an impeller and pinion assembly is provided. The assembly may include a pinion having a tapered bore with a polygonal shaped cross-section. The impeller may include a tapered plug having a polygonal shaped cross-section, the plug being configured to be received into the bore of the pinion. A fastener may be provided for securing the impeller to the pinion, the fastener adapted to be inserted into a passage in the plug of the impeller. The plug of the impeller is split so that when the fastener is inserted into the passage the plug expands against the side wall of the bore thereby creating an interference fit between the pin ion and the impeller.

The assembly may further include a recess positioned in the base of the bore of the first coupling member for holding the fastener. Preferably, the passage in the plug is drilled. The fastener may include an end portion having a region with a cross-sectional area substantially greater than the cross sectional are of a shank portion of the fastener. The end portion may further include a threaded portion to be positioned in the recess.

It is to be understood that both the foregoing general description and the following detailed description are exemplary and explanatory only and are only intended to provide a further explanation of the present invention, as claimed. The foregoing and additional objects and advantages of the invention will become more apparent as the following detailed description is read in conjunction with the accompanying drawings.

BRIEF DESCRIPTION OF THE DRAWINGS

The invention may be more fully understood with reference to the accompanying figures. The figures are intended to illustrate exemplary embodiments of the present invention without limiting the scope of the invention.

FIG. 4 is a side view in elevation of a bolt used for connection an impeller to a pinion according to the present invention;

FIG. 5 is a cross-sectional view of a shaft or pinion according to the present invention;

FIG. 6 is a cross-sectional view of an assembled impeller pinion coupling according to the present invention; and FIG. 7 is an end view of a conventional polygonally shaped pinion and hub coupling.

DETAILED DESCRIPTION

Figure 1:
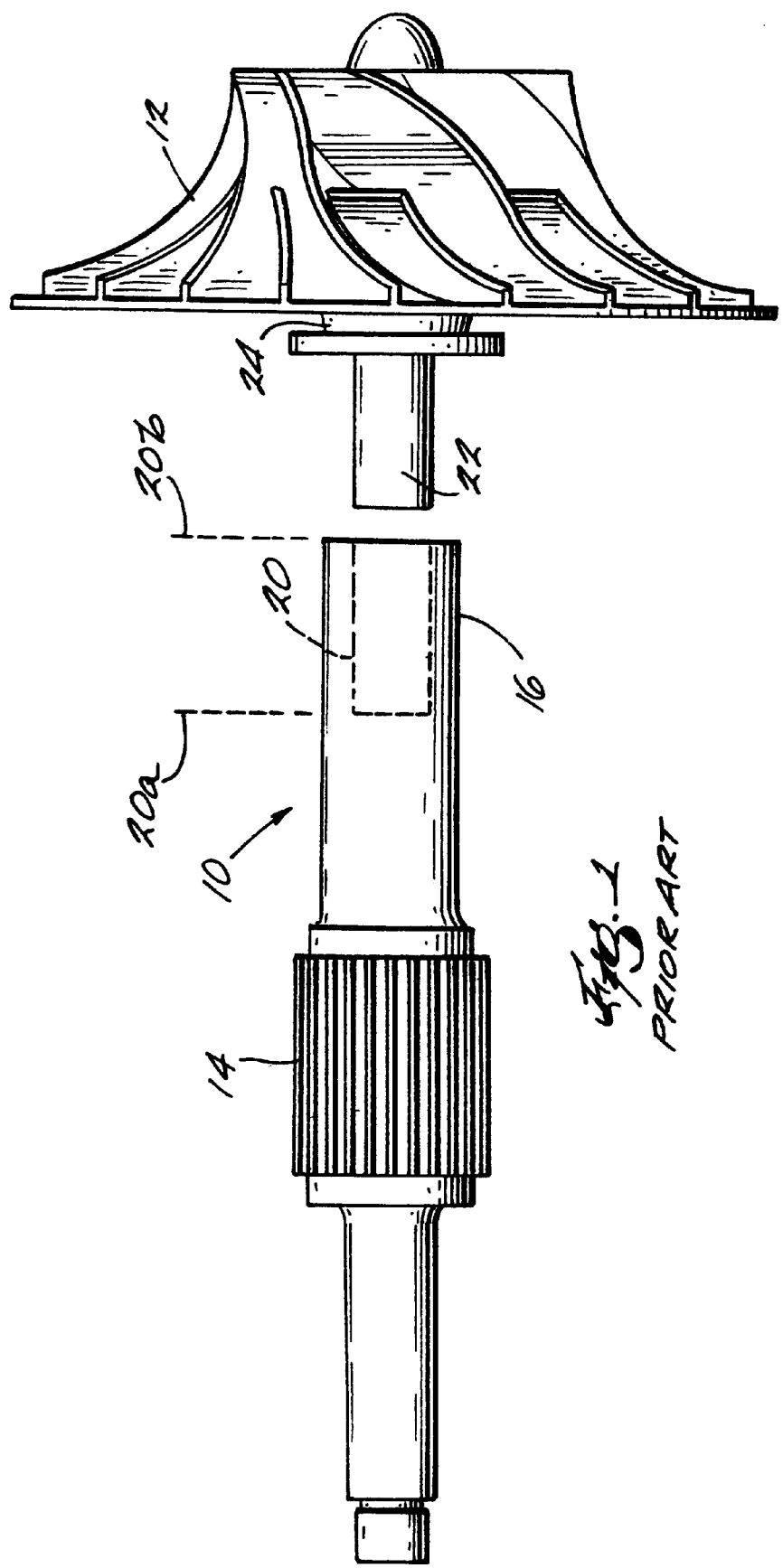
FIG. 1 is an exploded view of a pinion and an impeller for a centrifugal compressor.

Although references are made below to directions, such as left, right, up, down, etc., in describing the drawings, they are made relative to the drawings (as normally viewed) for convenience. These directions are not intended to be taken literally or limit the present invention in any form. Similar reference characters designate corresponding parts throughout the several views, FIG. 1 illustrates a pinion 10 and an impeller 12 which are designed to be employed in a centrifugal compressor.

The pinion 10 includes gearing 14 which is engageable with a power transmission assembly which drives the pinion about a pinion axis at a predetermined rotational velocity during operation of the centrifugal compressor. The pinion 10 further includes a driving end 16. The driving end 16 has formed therein a polygonally dimensioned bore 20 extending from a location 20A to a location 20B. The polygonally dimensioned bore 20 has an interior bore surface which defines a generally triangular cross section composed of circular arcs. The driving end 16 includes an annular surface which surrounds the polygonally dimensioned bore 20.

The impeller includes a polygonally dimensioned stem or stem portion 22 which is defined by an exterior stem surface. The polygonally dimensioned stem 22 is suitably matingly dimensioned to be received by the polygonally dimensioned bore 22. Also, formed on the impeller 12 is a shoulder or shoulder portion 24. When the pinion 10 and the impeller 12 are coupled, the fit between the polygonal bore 20 and the polygonal stem 22 provides for positive coupling locking between the pinion and the impeller. This polygonal coupling design permits the impeller 12 to be easily assembled on, or easily disassembled from, the pinion 10 and the centrifugal compressor. When properly coupled, the interior surface of the polygonal bore 20 and the exterior surface of the polygonal stem 22 are disposed in contacting, substantially stationary relation, one to each other as shown in FIG. 7. The polygon connection results in a gap 15.

An improved attachment design is shown in FIGS. 2–6. The coupling includes three major components, an impeller 100, a fastener 200 and a pinion or shaft 300.

Figure 3:
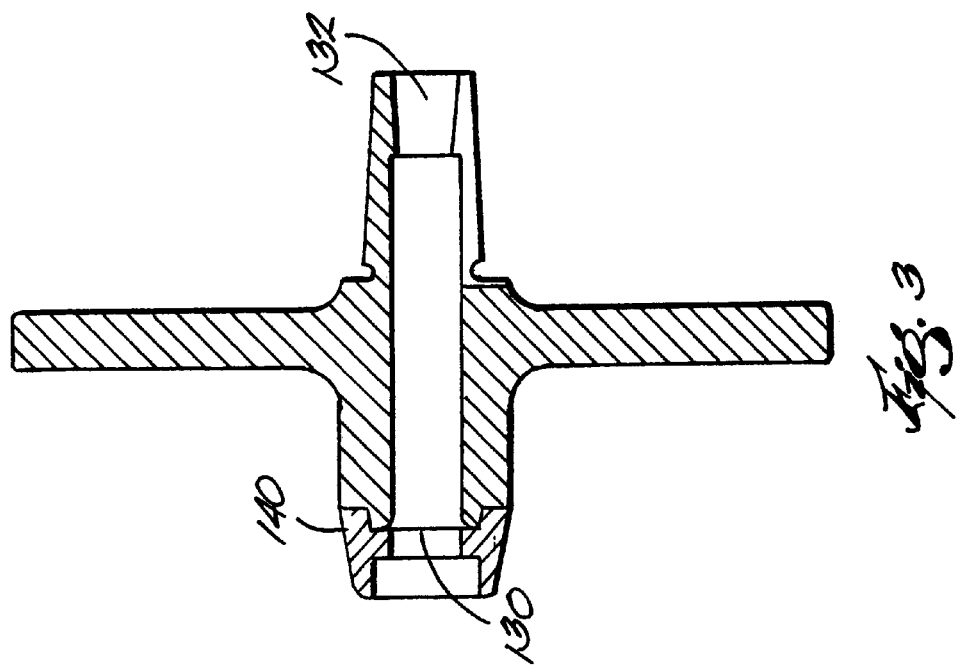
FIG. 3 is cross-sectional view of the impeller of FIG. 2 in the direction of lines A—A of FIG. 2.
Figure 2:
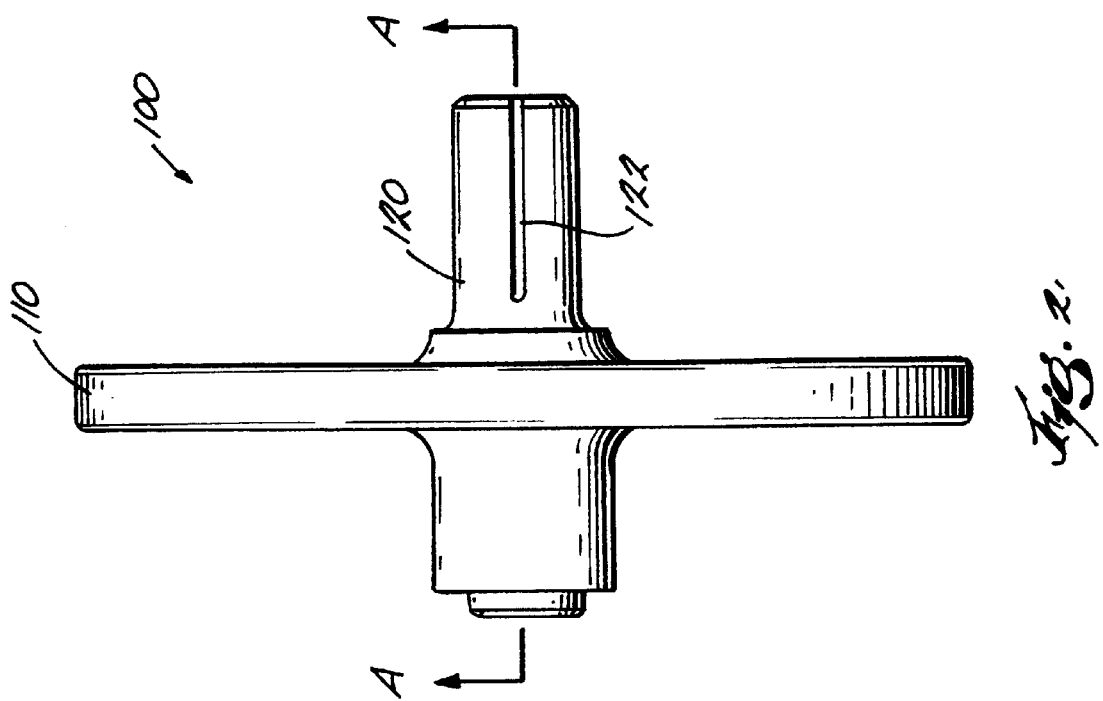
FIG. 2 is bottom view in elevation of an impeller for a centrifugal compressor according to the present invention.

The impeller 100 is shown in FIGS. 2 and 3. The impeller includes a polygonal stem or plug 120 and conventional vanes 110. The plug 120 includes split 122 extending longitudinally down the plug. The impeller 100 includes a centrally located bore 130. The bore or passage 130 extends the length of the impeller 100 and is sized to receive a fastener for attaching the impeller to a shaft. The passage 130 includes an area of reduced cross section 132 at the end of the stem to be inserted into a hub or bore of pinion. The impeller may include an appropriately sized end portion 140 to receive the bolt 200.

The fastener 200, shown in FIG. 4, includes a bolt head 230, a shank portion 220 and an end portion 230. The end portion 230 includes a threaded portion 234 and an enlarged portion 232. The enlarged portion 232 has a larger cross-sectional area than the shank 220 portion of the fastener 200. The enlarged portion 232 may be formed by machining the fastener. Preferably, the shank 220 and end portions 230 are of a conventional cylindrical design with generally circular cross-sections.

The pinion or drive shaft 300 includes a tapered opening 310 for receiving the stein or plug 120 of the impeller. The opening or bore 310 has a polygon shaped cross-section. A threaded recess 320 may be provided at the base of the bore 310 for securing the fastener 200 to the pinion 300. The bore 310 and recess 320 may be drilled out of a conventional pinion. The cross-sectional shape of the plug 120 and the bore 310 may be any suitable polygon configuration such as, for example, the generally triangular cross-section shown in FIG. 7.

When it is desired to attach the impeller 100 to the pinion 300 the plug 120 is inserted into the bore 310 of the pinion 300. The initial fit between the polygon shapes of the bore 310 and plug 120 may be somewhat loose. The fastener or bolt 200 is then used to secure the assembly. The bolt 200 is inserted until the enlarged portion 232 of the bolt contacts the interior of the impeller passage 132. An interference fit is established between the enlarged portion of the bolt 232 and the matching portion 132 of the hole drilled in the impeller plug 130. As the bolt 200 is tightened by rotating the thread portion 234 within the recess 320, the plug polygon 120 is expanded to contact the side wall of the bore 310 thereby creating an interference fit between the impeller and the pinion or rotor with the bore polygon.

The plug 120 is allowed to expand due to the presence of the split 122. This results in a consistent and improved retention of rotor balance. Unlike the conventional polygon connection shown in FIG. 7, the improved connection of the present invention does not produce a gap 15. A further advantage of this improved attachment design is its ease of assembly and disassembly and its self centering characteristics. The tapered polygon designs allows tolerances required by conventional designs to be relaxed. For example, the gap between the mating parts may be on the order of 0.033 inches.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as Further embodiments of the present invention. The scope of the present invention is to be defined as set forth in the following claims.

What is claimed is:

1. An impeller and pinion assembly comprising:
   a pinion including a tapered bore having a polygonal shaped cross-section;
   an impeller including a tapered plug having a polygonal shaped cross-section, the plug configured to be received into the bore of the pinion;
   a fastener for securing the impeller to the pinion, the fastener adapted to be inserted into a passage in the plug of the impeller;
   wherein the plug of the impeller is split so that when the fastener is inserted into the passage the plug expands against the side wall of the bore thereby creating an interference fit between the pinion and the impeller.

2. The assembly of claim 1, further comprising:
   a recess positioned in the base of the bore of the pinion, wherein the fastener passes through the passage in the plug and is retained in the recess.

3. The assembly of claim 1, wherein the passage in the plug is formed by drilling.

4. The assembly of claim 1, wherein the fastener comprises an end portion and a shank portion, the end portion having a region with a cross-sectional area substantially greater than the cross sectional area of the shank portion.

5. The assembly of claim 1, wherein substantially no gap exists between the plug and the bore.

6. The assembly of claim 4, wherein the end portion includes a threaded portion.

7. The assembly of claim 6, wherein the first coupling member includes a recess located in the base of the bore for receiving the threaded portion of the fastener.

8. The assembly of claim 6, wherein the fastener includes a bolt head.

9. The assembly of claim 1, wherein the impeller and pinion assembly is installed in a centrifugal compressor.

* * * * *

UNITED STATES PATENT AND TRADEMARK OFFICE
CERTIFICATE OF CORRECTION

PATENT NO. : 6,461,111 B1
DATED : October 8, 2002
INVENTOR(S) : Ronald L. Haugen et al.

It is certified that error appears in the above-identified patent and that said Letters Patent is hereby corrected as shown below:

Column 4,
Line 54, after "having", delete "a" and insert -- an enlarged --.
Line 59, delete "first coupling member" and insert -- pinion --.

Signed and Sealed this

Seventeenth Day of June, 2003

JAMES E. ROGAN
*Director of the United States Patent and Trademark Office*